United States Patent Office 3,773,872
Patented Nov. 20, 1973

3,773,872
METHOD OF MANUFACTURING A COVERED WIRE
Setsuya Isshiki, Funabashi, and Tetsuo Shiromizu and Yasutugu Toyama, Tokyo, Japan, assignors to The Fujikura Cable Works, Ltd., Tokyo, Japan
Filed Sept. 17, 1971, Ser. No. 181,345
Claims priority, application Japan, Sept. 21, 1970, 45/82,805
Int. Cl. B29c 25/00
U.S. Cl. 264—23         9 Claims

ABSTRACT OF THE DISCLOSURE

A method of manufacturing a covered wire which comprises the steps: coating a conductor with insulating material such as uncross-linked polyethylene, unvulcanized rubber, etc. through extrusion molding, and curing the resulting covering layer by applying ultrasonic wave energy thereto; as well as apparatuses relevant to said method.

BACKGROUND OF THE INVENTION (a) Field of the invention

The present invention relates to a method of manufacturing a covered wire employing a cured polyethylene or rubber as the insulating material, as well as improvement of the apparatus pertaining thereto.

(b) Description of the prior art

The demand for electric wire and cable covered with an insulating material such as cross-linked polyethylene is increasing remarkably. As apparatus for use in manufacturing such covered wire and cable, a continuous vulcanization machine for use in manufacturing a covered wire by applying rubber as the insulating material is popular. This continuous vulcanization machine, as is known well, consists of an extruder and a long iron pipe called a curing tube, said curing tube being so devised as to perform heating as well as cooling by means of steam or water introduced therein. In the manufacture of a covered wire by employing such an apparatus, the productivity has a great bearing on the thermal conductivity of the heating tube thereof. Especially, in case of a cross-linkable polyethylene and rubber which give rise to the cross-linking reaction by virtue of heating, it is necessary to apply an appropriate temperature as well as time to ensure a perfect cross-linking reaction, but, as a matter of fact, transmission of heat to the innermost part of the covering layer is not effected smoothly, and, as a result, the cross-linking tends to be insufficient, so that it usually takes much time to raise the inner temperature of said layer sufficiently.

In order to raise said temperature in a short time, it is desirable to raise the temperature of the heat transfer medium. However, in case of application of steam as the heat transfer medium as in the prior art, a high pressure is required to raise the temperature of steam, and it is quite difficult to obtain steam having a temperature of more than 200° C. for practical use. To cope with this trouble, the inventors of the present invention previously proposed the employment of higher alcohol maintained above the boiling point thereof as the heat transfer medium. This measure is effective for achieving the foregoing object in a way, but it substantially relates to a simple transmission of heat taking advantage of the thermal difference and, therefore, is not satisfactory enough.

The insulating material coated on a conductor by means of an extruder is cured by high-pressure steam simultaneously with extrusion and is thereafter take out from the curing tube after cooling with high-pressure water, thus becoming a finished product. The speed of production on this occasion is determined by the time required for completion of the transmission of heat to such an extent as being sufficient for fully effecting the cross-linking up to the innermost layer of the insulating material as well as the subsequent cooling. In other words, the thicker is the layer of the insulating material the more time is required for exposing it to high-pressure steam, and particularly in case of a bad thermoconductor such as cross-linked polyethylene and synthetic rubber, it takes a considerable time to raise the inner temperature sufficiently. A measure to make up for such shortcomings is to raise the temperature of said high-pressure steam, but it is not easy to put it into practice because application of an excessively high pressure will result in troubles regarding the pressure resistivity of the machine or apparatus concerned and the structure of the outlet for the cable, while an alternative measure such as making the temperature of the coating material at the time of extrusion as high as possible is apt to give rise to the cross-linking reaction within the extruder.

Further, as the means to raise instantaneously the temperature of the inner layer of the coating material, employment of the electronic range devised to perform dielectric curing by applying high frequency and the like is well known. But, in case of application of such a device to a material with superior electric insulating properties, such as cross-linked polyethylene and synthetic rubber, the dielectric loss is so little that the generation of heat can hardly take place. On the other hand, the high-frequency sonic waves, to wit, ultrasonic waves are absorbed by said cross-linkable polyethylene and synthetic rubber, resulting in a rise in temperature. Unlike the employment of high frequency, the employment of a gas as the medium for transmission of ultra sonic waves on this occasion hampers the transmission of energy because of the free compressibility of gas and necessitates said transmission of energy to the insulating material through the medium of a liquid or a rigid body.

SUMMARY OF THE INVENTION

The object of the present invention is to facilitate the transmission of heat to an insulating material by utilizing ultrasonic waves and to increase the speed of curing the cross-linkable polyethylene as well as the rubber, thereby enhancing the productivity of covered wires.

The present invention relates to a method of manufacturing covered wires, which is characterized by the steps: coating a conductor with an insulating material such as uncross-linked polyethylene or unvulcanized rubber in molten state by extrusion molding; curing the thus provided covering layer of insulating material by applying ultrasonic wave energy thereto either directly or through a transfer medium.

BRIEF DESCRIPTION OF THE DRAWINGS

In the appended drawings.

DETAILED DESCRIPTION

Figure 1:
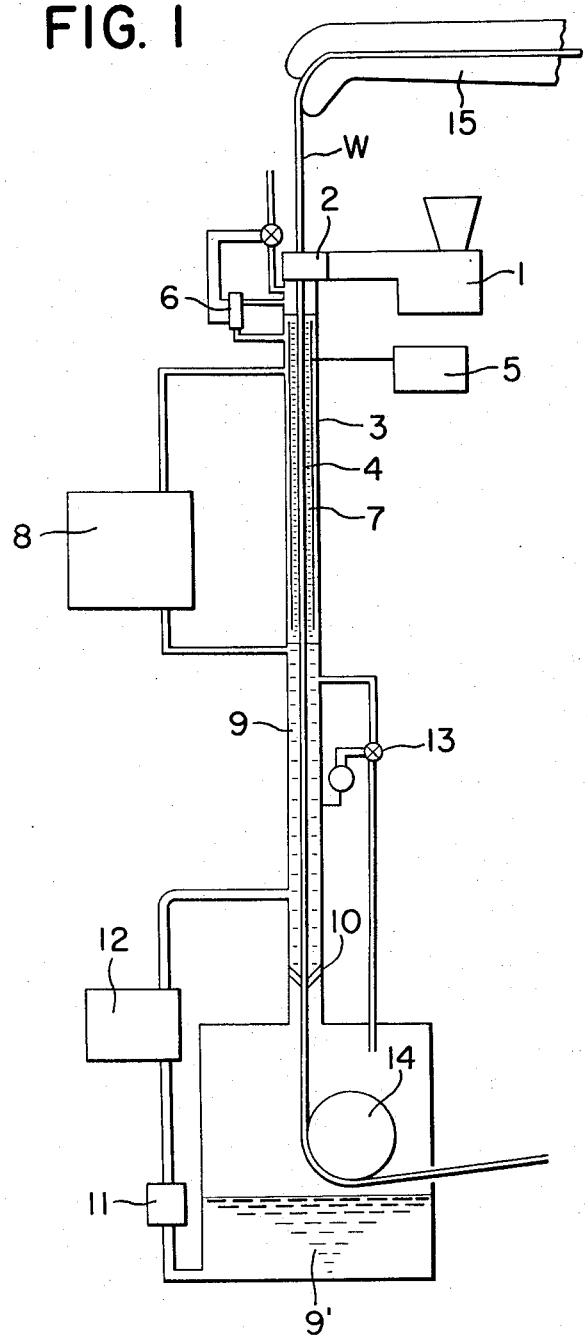
FIG. 1 shows a diagrammatic cross-sectional view of a part of an apparatus for use in manufacturing covered wires according to the present invention, wherein the ultrasonic sound source is provided in the curing zone.

Referring to FIG. 1, the numeral reference 1 denotes the extruder, 2 denotes the die, 3 denotes the curing tube, 4 denotes the ultrasonic sound source provided on the inner wall of said curing tube, and 5 denotes the ultrasonic wave oscillating device connected with said sound source. The preheated conductor W drawn out by the supply device 15' is coated with the molten insulating material by the head 2 of the extruder 1 and is introduced into the curing tube 3. The covered wire thus introduced is surrounded by the heat transfer medium 7 filling the curing tube 3, and is further subjected to curing by means of the ultrasonic wave energy emanating from the ultrasonic sound source provided within the curing tube 3. On this occasion, it is desirable to preheat the heat transfer medium to expedite the rise in temperature. The covered wire thus cured is cooled by the cooling medium 9 in the lower part of the curing tube 3, passes through the packing 10 and is taken out as a finished covered wire via the turn pulley 14. In the same drawing, the numeral reference 6 denotes the automatic liquid-level regulator for the heat transfer medium, 8 denotes the heat circulator, 11 denotes the circulating pump for the cooling medium 9 flowing down through the packing 10, 12 denotes the heat exchanger and 13 denotes the pressure regulator.

In this connection, although a diaphragm to partition the heat transfer medium 7 from the cooling medium 9 is not provided within the curing tube 3, these two media never get mixed with each other because of the difference in temperature. Besides, due to application of pressure on the heat transfer medium by means of the circulating pump 11 to prevent the gas arising from the cross-linking reaction of the insulating material from foaming, coupled with the deairing effect of the ultrasonic waves, there is no fear of the insulating material getting foamed at all.

According to the method as above, by virtue of the multiplied effect of the heat transfer medium in liquid state and the ultrasonic waves transmitted therethrough, the insulating material such as cross-linkable polyethylene and rubber coated on the conductor can be rapidly heated and cured, thereby remarkably increasing the production of covered wires of this kind.

Figure 2:
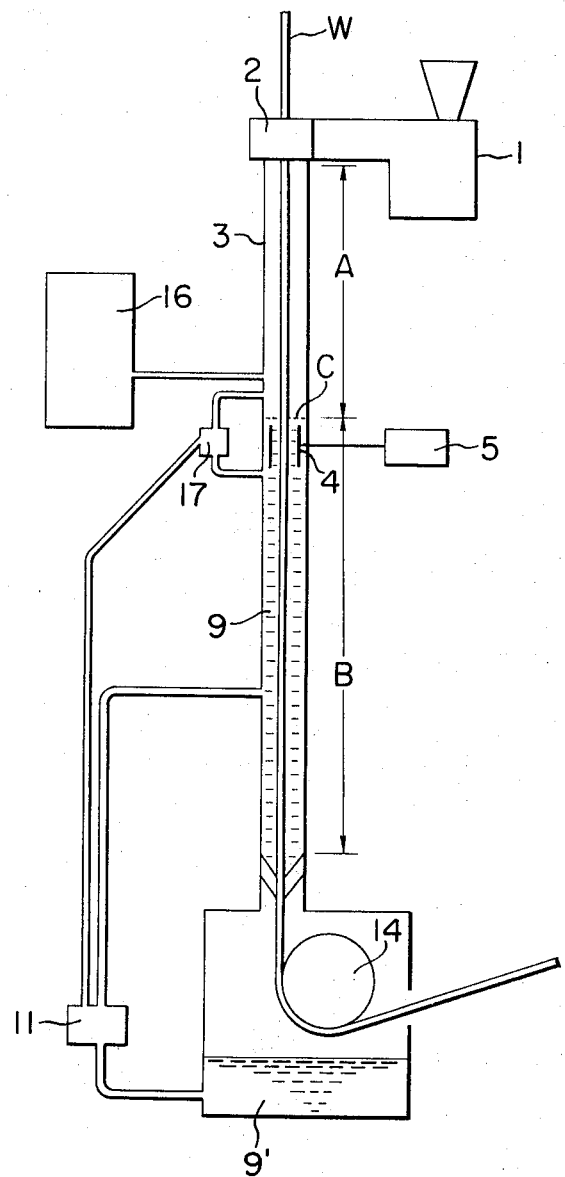
FIG. 2 shows a diagrammatic cross-sectional view of a part of an apparatus for use in manufacturing covered wires according to the present invention, wherein the ultrasonic sound source is provided in the cooling zone.

FIG. 2 is a schematic representation of an apparatus according to the present invention, wherein the ultrasonic sound source is provided within the cooling zone of the curing tube. To be precise, the curing tube 3 is divided into the heating zone A and the cooling zone B, while the ultrasonic sound source 4 is provided on the inner wall of the curing tube 3 and disposed in the cooling zone B thereof at a location near the boundary C shown by a broken line between said two zones so as to connect with the ultrasonic wave oscillating device 5 equipped outside said curing tube.

At the time of preparing a covered electric wire by employing the foregoing apparatus, the preheated conductor W is coated with a molten insulating material by the cross head 2 of the extruder 1 and is introduced into the curing tube 3. The covered wire thus introduced is first made to pass through the heat transfer medium, such as high-pressure steam, filled in the heating zone A, whereby mainly the external region of the insulating material layer is cured. Subsequently, the covered wire is introduced into the cooling zone B filled with the cooling medium, such as water, wherein said covered electric wire—which has been provided with a covering layer of completely cured insulating material as a result of heating of the internal region of the insulating material layer effected by the ultrasonic waves emanated from the ultrasonic sound source provided within the curing tube 3 of the cooling zone B adjacent to the heating zone A immediately after passing through the heat transfer medium—is cooled by the cooling medium and then is taken out therefrom. In this connection, the numeral reference 16 in the same drawing denotes the high-pressure steam generator to supply a high-pressure steam to the heating zone A, 17 denotes the cooling medium level regulator, and 11 denotes the high-pressure pump to circulate the cooling medium.

As to the shape of the ultrasonic sound source, it is desirable to be cylindrical in view of the fact that the cross-sectional configuration of the covered wire as well as the curing tube is round and for the purpose of augmenting the generation of heat within the covered wire. Nevertheless, plate shape and others are also applicable though their efficiency is somewhat lower than that of said cylindrical one.

According to the conventional art of heating by transmitting heat from the outside, the rise in temperature advances gradually from the external region toward the internal region of the insulating material in accordance with the heat transfer coefficient thereof, while in case of the heating by ultrasonic waves within such a liquid medium for cooling as employed for the foregoing apparatus, the rise in temperature starts from the internal region of the covering layer and pervades in scores of seconds. Therefore, when the insulating material layer is subjected to heating for a length of time which is enough for raising the temperature of only the external region thereof to some degree in the heating zone and the ultrasonic waves are applied thereafter to said insulating material layer at the entrance of the cooling zone, the temperature of the internal region of said layer rises. Besides, the time of exposure to the ultrasonic waves on this occasion suffices to be very short and, therefore, it will do to assign only a little space for this exposure operation, and, not only that, the length of the heating zone also suffices to conform with the length of the curing tube necessary for performing insulation of a thin material. Further, the extent of the influence exerted by the cooling by a cooling medium on the effect of the application of ultrasonic waves in the cooling zone is confined to the outermost region of the insulating material layer, and generation of heat in the internal region of said layer is never effected thereby.

Provision of the ultrasonic sound source within the heating zone is attended with troubles such that the material to be employed for the sound source should be one which is durable at a high temperature (about 200° C.), and the ceramic material, which is usually applied to the sound source, stands a fairly high temperature but is rather expensive and the life span thereof is short. On the contrary, in case of the aforesaid apparatus, the ultrasonic sound source is provided within the cooling zone, so that an inexpensive material can serve for the sound source over a long period of time. As the material for use in transmitting the ultrasonic waves, a liquid must be employed, but, in case it is intended to provide the sound source within the heating zone, the employment of steam as the heat transfer medium is infeasible. In this respect, the aforesaid apparatus does not require any specific medium as the cooling medium; it renders it possible to apply inexpensive water. Moreover, the present invention can be readily put into practice through just a partial remodeling of the conventional continuous vulcanizer without making any practical change of the mechanism thereof.

Figure 3:
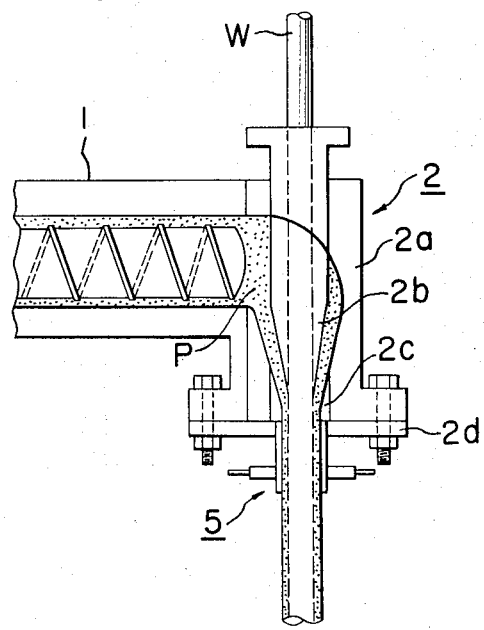
FIG. 3 shows a diagrammatic cross-sectional view of a part of an extruder according to the present invention, wherein the ultrasonic wave oscillating device is mounted on the end of the extruding die.

FIG. 3 is another schematic representation of apparatus to be utilized in practicing one embodiment of the present invention, wherein 1 denotes the extruder and 2 denotes the cross head die mounted on the end of said extruder. Said cross head die 2 consists of the cross head 2a, nipple 2b, die 2c and die holder 2d, and is not different from the conventional cross head die of the extruding machine for use in wire-coating.

Figure 4:
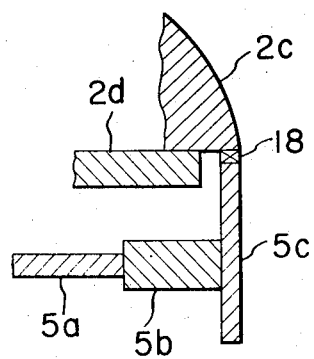
FIG. 4 shows a diagrammatic fragmental cross-sectional view, on an enlarged scale, of the essential part of FIG. 3.
Figure 5:
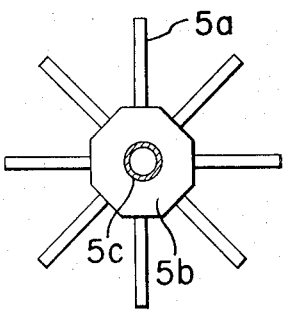
FIG. 5 shows a diagrammatic plan view of an ultrasonic wave oscillating device according to the present invention.

The present apparatus is so devised that the ultrasonic wave oscillating device 5 is disposed adjacent to the outlet of the foregoing cross head die 2, and this ultrasonic wave oscillating device 5 consists of the radially disposed ultrasonic wave oscillating members 5a, the oscillator 5b which is directly connected with these oscillating members 5a, and the tubular oscillating tube 5c which vertically intersects said oscillator 5b, as shown in FIGS. 4 and 5. This ultrasonic wave oscillating device 5 is supported by an appropriate retainer (not shown here) and also is so disposed as to axially align the oscillating tube 5c and the die 2c. The numeral reference 18 in FIG. 4 denotes the packing for avoiding transmission of the ultrasonic waves from the oscillating tube 5c to the die 2c.

In an extruding apparatus having the foregoing construction, the conductor W composed of a single wire or a stranded wire is introduced into the nipple 2b and is coated with the molten insulating material P, such as uncross-linked polyethylene or vulcanizable rubber, being extruded from the extruder 1 within the die 2c. And, immediately after its coming out from the die 2c, the ultrasonic waves emanated from the ultrasonic wave oscillating members 5a are transmitted to the insulating material through the oscillator 5b and by way of the oscillating tube 5c. The covering insulating material thus provided on the conductor W gets heated by absorbing the ultrasonic waves directly transmitted from the oscillating tube 5c, whereby the cross-linking or the vulcanization is expedited. On this occasion, the oscillating tube 5c serves concurrently as the guide tube of the covered wire being extruded.

According to the foregoing apparatus, transmission of the ultrasonic waves to the molten insulating material is performed in the vicinity of the aperture of the die where the working pressure of screw of the extruder is at its maximum, so that absorption of ultrasonic waves by the molten insulating material is performed very satisfactorily and, as a result, the thermal cross-linking or vulcanization can be sufficiently effected in a very short time and up to the innermost part of said material.

Besides, in view of the fact that the molten insulating material at the time of passing through the cross head meets frictional resistance of the wall surface of the cross head—particularly the surface of the nipple and the inner surface of the die—and especially the narrow apertures therein reduces the speed of extrusion, it is usual to mount the heating devices on the cross head in order to smooth the flow of the molten insulating material. This measure, however, entails such a trouble that stagnation of the flow of molten insulating material at the extruding orifice of the die brings about an excessive cross-linking or vulcanization of the molten insulating material, resulting in a gross impairment of the value of the insulated wire product. According to the foregoing apparatus, on the contrary, the stagnation of molten insulating material such as occurring on the wall surface of the cross head is destroyed by the powerful oscillation effected by ultrasonic waves and the replacement of the stagnating material with fresh material is expedited, resulting in a product of excellent finish.

Moreover, in case of manufacturing a covered electric wire having a thin layer of insulating material, the process of heating by the curing tube in the wake of extrusion can be dispensed with.

Example 1

When a covered electric wire consisting of a 100 mm.$^2$ conductor and covered by 4 mm. thick insulating layer of cross-linkable polyethylene was subjected to ultrasonic waves (400 kHz.; output: 50 w./cm.$^2$) in a gap of 5 mm. under water being heated at 180° C. under elevated pressure, the time required for raising the temperature of polyethylene contiguous to the conductor was as shown in the following.

For the purpose of comparison, the time required for raising the temperature of polyethylene to the same extent when it was heated by the steam of 200° C. without applying ultrasonic waves was also shown in the following.

Time required when the ultrasonic wave
  was applied _____ seconds__ 10
Time required when only steam was
  applied _____ minutes__ 4

Further, in order to accomplish the cross-linking of 80% gelation, heating at 170° C. for 5 minutes is required.

In this context, the rise in temperature of polyethylene further advances in both cases, and the speed of the cross-linking reaction rapidly increases as the temperature rises. Accordingly, in case of application of the ultrasonic waves under the foregoing conditions, the time required for effecting the cross-linking was 15 seconds, while in case of application of steam only, it was 6.5 miunutes.

Example 2

By comparing the case wherein a coated electric wire consisting of a 100 mm.$^2$ conductor covered by 15 mm. thick insulating layer of cross-linkable polyethylene was heated by the steam of 200° C. under elevated pressure and subsequently subjected to heating by the ultrasonic sound source of ultrasonic waves (400 kHz; output: 50 w./cm.$^2$) within the cooling zone filled with water with the case wherein the same coated electric wire was not subjected to said heating by ultarsonic waves, the time required for effecting 80% gelation of the insulating layer (gelation by 80% requires heating at 170° C. for 5 minutes) was examined. The result was as shown in the following.

Minutes
Time required when the ultarsonic wave was applied__ 5
Time required when the ultrasonic wave was not
  applied _____ 30

Example 3

In the process of curing by heating a covered electric wire consisting of a 100 mm.$^2$ conductor and covered by 10 mm. thick insulating layer of ethylene propylene rubber with steam of 200° C. following extrusion by an extruder, the time required for curing said rubber in case it was subjected to heating by ultrasonic waves emanating from the ultrasonic sound source, such as shown in FIG. 5, disposed adjacent to the die of the extruder and in case it was not subjected to said heating by ultrasonic waves, was as shown in the following, respectively.

Minutes
Time required when the ultrasonic wave was applied __ 5
Time required when the ultrasonic wave was not applied __ 25

What is claimed is:

1. A method of continuously manufacturing an electric conductor wire covered with a layer of insulating material selected from the group consisting of cross-linked polyethylene and vulcanized rubber, which comprises:
   continuously extruding onto said conductor wire a molten coating layer of a material selected from the group consisting of cross-linkable polyethylene and vulcanizable rubber;
   immediately moving said coated wire into and through an elongated heating zone which is substantially filled with a pressurized liquid and, in said heating zone, applying ultrasonic wave energy to said liquid and thereby transmitting said ultrasonic wave energy through said liquid to said coating layer, the ultrasonic wave energy being applied to said coating layer in a radial direction in said heating zone for a period of time and at an intensity effective to cause cross-linking or vulcanization of said layer through the entire thickness thereof, and said pressurized liquid being effective to suppress foaming of said coating layer;

and then cooling the coated wire.

2. A method as claimed in claim 1, in which water is employed as the pressurized liquid in the heating zone.

3. A method as claimed in claim 1, in which the pressurized liquid is heated.

4. A method as claimed in claim 1, in which the cooling is carried out by moving the coated wire from said heating zone directly into and through an elongated cooling zone filled with pressurized cooling liquid.

5. A method as claimed in claim 1, in which the ultrasonic wave energy is supplied to said pressurized liquid in a region encircling said coated wire and extending substantially the entire length of said heating zone.

6. A method of continuously manufacturing an electric conductor wire covered with a layer of insulating material selected from the group consisting of cross-linked polyethylene and vulcanized rubber, which comprises:

continuously extruding onto said conductor wire a molten coating layer of a material selected from the group consisting of cross-linkable polyethylene and vulcanizable rubber;

immediately moving said coated wire into and through an elongated heating zone and therein heating the exterior of said coating layer with a heating fluid to cure the exterior portion of said layer;

then moving said coated wire directly into and through an elongated cooling zone substantially filled with a pressurized cooling liquid and, in said cooling zone at a location therein close to the juncture thereof with the heating zone, applying ultrasonic wave energy to said cooling liquid and thereby transmitting said ultrasonic wave energy through said liquid to said coating layer, the ultrasonic wave energy being applied to said coating layer in a radial direction in said cooling zone for a period of time and at an intensity effective to cause cross-linking or vulcanization of said layer through the entire thickness thereof, and said pressurized liquid being effective to suppress foaming of said coating layer.

7. A method according to claim 6, in which water is employed as the pressurized cooling liquid in said cooling zone.

8. A method according to claim 6, in which steam is employed as the heating fluid in said heating zone.

9. A method according to claim 6, in which the ultrasonic wave energy is supplied to said pressurized cooling liquid in a region encircling said coated wire, located adjacent the entrance for said coated wire into said cooling zone and extending only partway along said cooling zone so that said coated wire is cooled as it passes through the remainder of said cooling zone.

References Cited

UNITED STATES PATENTS

| | | | |
|---|---|---|---|
| 2,626,430 | 1/1953 | Dawson | 264—23 |
| 3,325,386 | 6/1967 | Jurchewitz | 264—23 X |
| 3,392,219 | 7/1968 | Smith | 264—25 X |
| 3,513,228 | 5/1970 | Miyauchi | 264—25 |
| 3,184,791 | 5/1965 | Gamble | 264—23 X |
| 3,246,055 | 4/1966 | Pendleton | 264—23 |

ROBERT F. WHITE, Primary Examiner

R. R. KUCIA, Assistant Examiner

U.S. Cl. X.R.

264—25

UNITED STATES PATENT OFFICE
CERTIFICATE OF CORRECTION

Patent No. 3,773,872  Dated November 20, 1973

Inventor(s) Setsuya Isshiki, Tetsuo Shiromizu and Yasutugu Toyama

It is certified that error appears in the above-identified patent and that said Letters Patent are hereby corrected as shown below:

In the heading, note additional priority data as follows:

| | | |
|---|---|---|
| Japan | October 7, 1970 | 45/87503 |
| Japan | February 10, 1971 | 46/5266 |

Signed and sealed this 16th day of April 1974.

(SEAL)
Attest:

EDWARD M. FLETCHER, JR.
Attesting Officer

C. MARSHALL DANN
Commissioner of Patents